(12) United States Patent
Suzuki

(10) Patent No.: US 6,590,864 B1
(45) Date of Patent: Jul. 8, 2003

(54) PROTECTION SWITCHING USING STANDBY SYSTEM FOR TRANSMISSION OF LINE STATUS SIGNALS

(75) Inventor: Kazuya Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,955

(22) Filed: Dec. 27, 1999

(30) Foreign Application Priority Data

Dec. 28, 1998 (JP) ............................................. 10-373637

(51) Int. Cl.[7] .................................................. H04J 1/16
(52) U.S. Cl. ....................................... 370/225; 370/228
(58) Field of Search ................................. 370/219, 220, 370/217, 216, 218, 244, 249; 340/853.2

(56) References Cited

U.S. PATENT DOCUMENTS

| 5,073,774 | A | * | 12/1991 | Ikawa | 340/825.01 |
| 5,796,717 | A | * | 8/1998 | Shinbashi et al. | 370/216 |
| 5,870,382 | A | * | 2/1999 | Tounai et al. | 370/220 |
| 5,936,942 | A | * | 8/1999 | McNeley et al. | 370/244 |
| 6,487,169 | B1 | * | 11/2002 | Tada | 370/219 |

FOREIGN PATENT DOCUMENTS

| JP | 60-248029 | 12/1985 |
| JP | 64-44155 | 2/1989 |
| JP | 2-13034 | 1/1990 |
| JP | 2-260729 | 10/1990 |

* cited by examiner

*Primary Examiner*—Seema S. Rao
*Assistant Examiner*—Melanie Jagannathan
(74) *Attorney, Agent, or Firm*—Sughrue Mion, PLLC

(57) ABSTRACT

A local network node, connected to a remote network node by an active transmission system and a standby transmission system, includes an active receiver for receiving communication signals from the active transmission system and detecting an operating state of the active transmission system. An active transmitter transmits communication signals over the active transmission system to the remote network node. A standby receiver receives, from the standby transmission system, a status signal indicating an operating state of the active transmission system detected by the remote network node. A standby transmitter transmits a status signal indicating the operating state detected by the active receive circuitry over the standby transmission system to the remote network node. A control circuit is responsive to an operating state detected by the active receiver and an operating state indicated by the status signal of the standby receiver for performing a protection switching between the active and standby transmission systems.

8 Claims, 6 Drawing Sheets

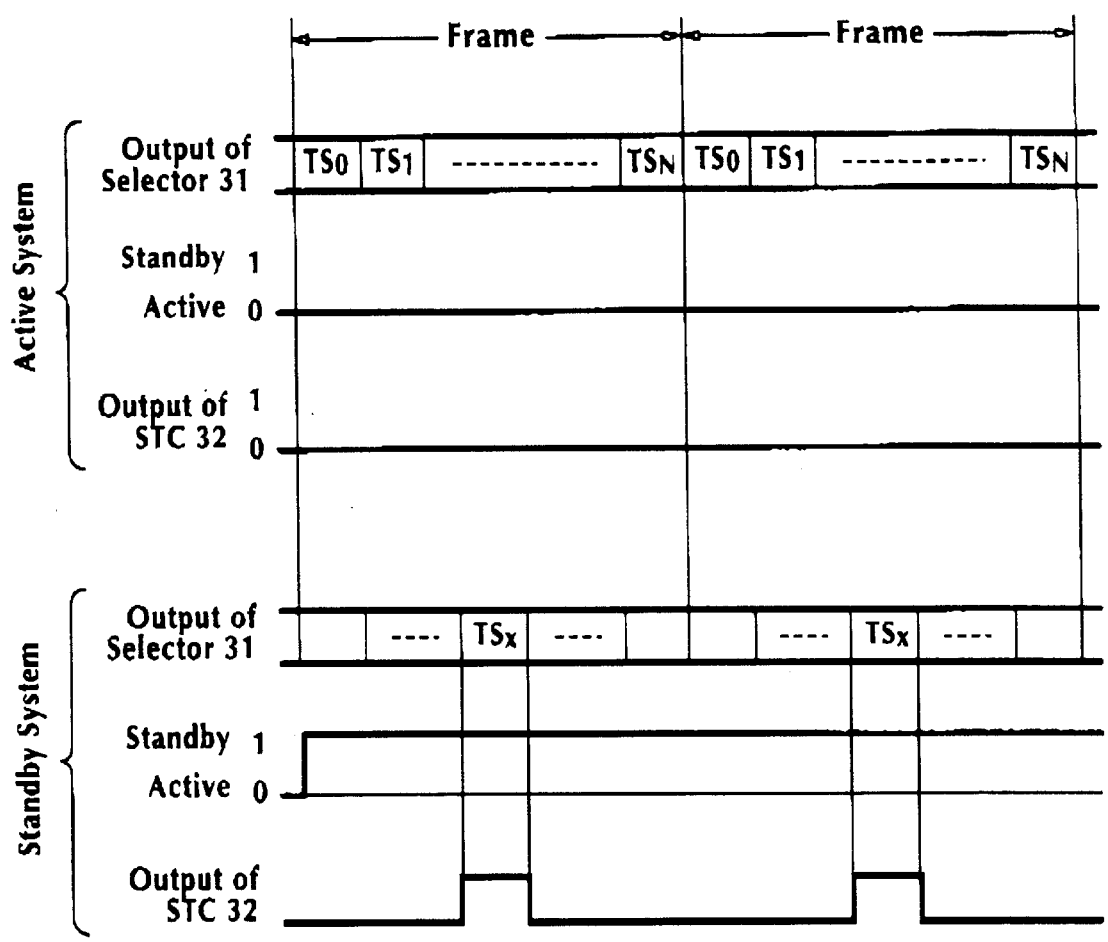

Fig. 3A
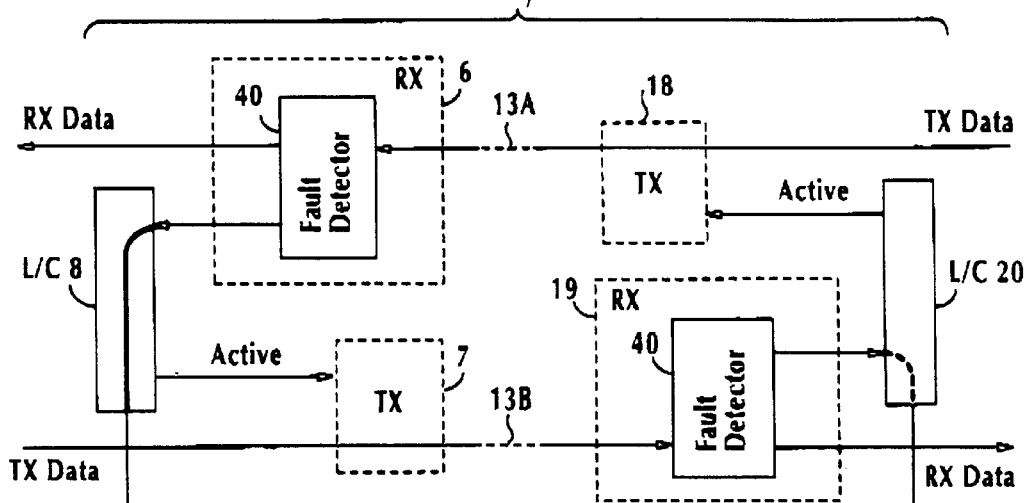
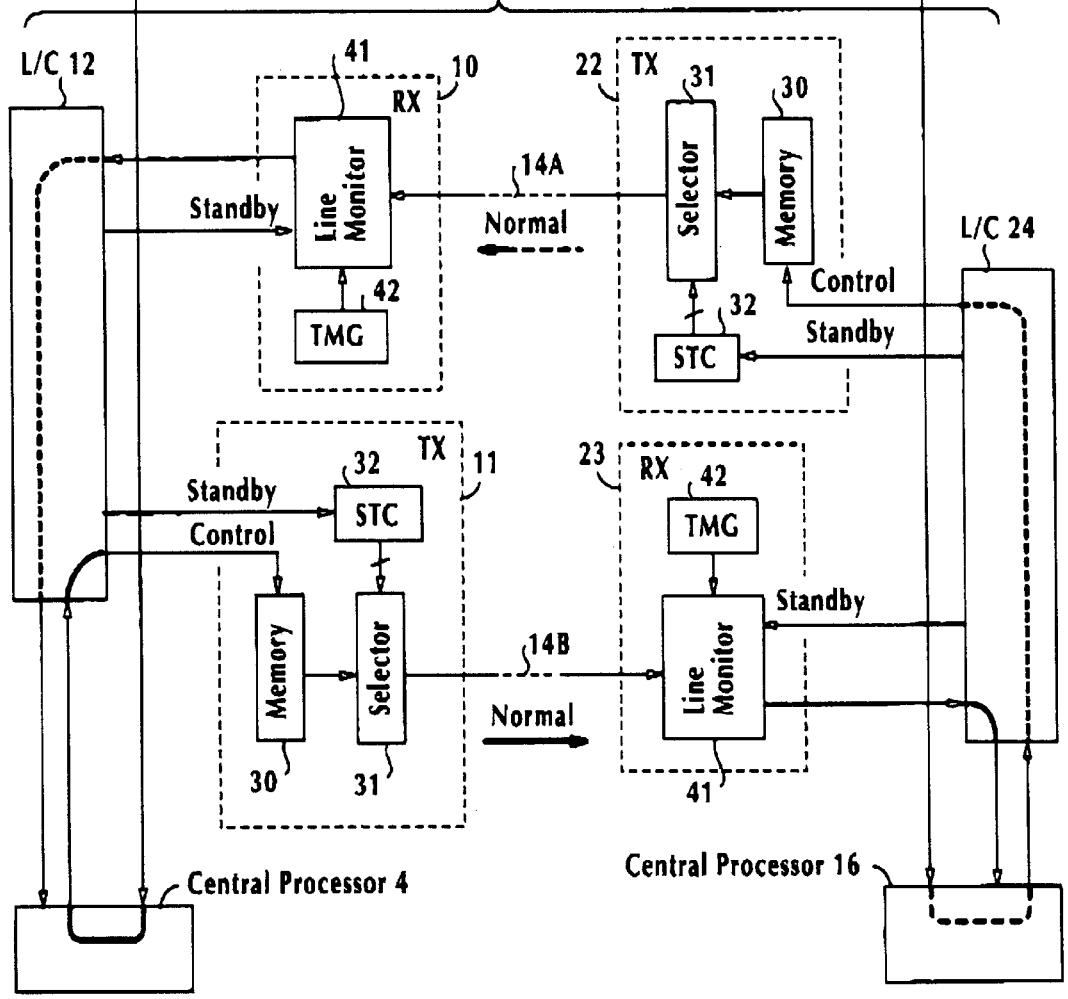

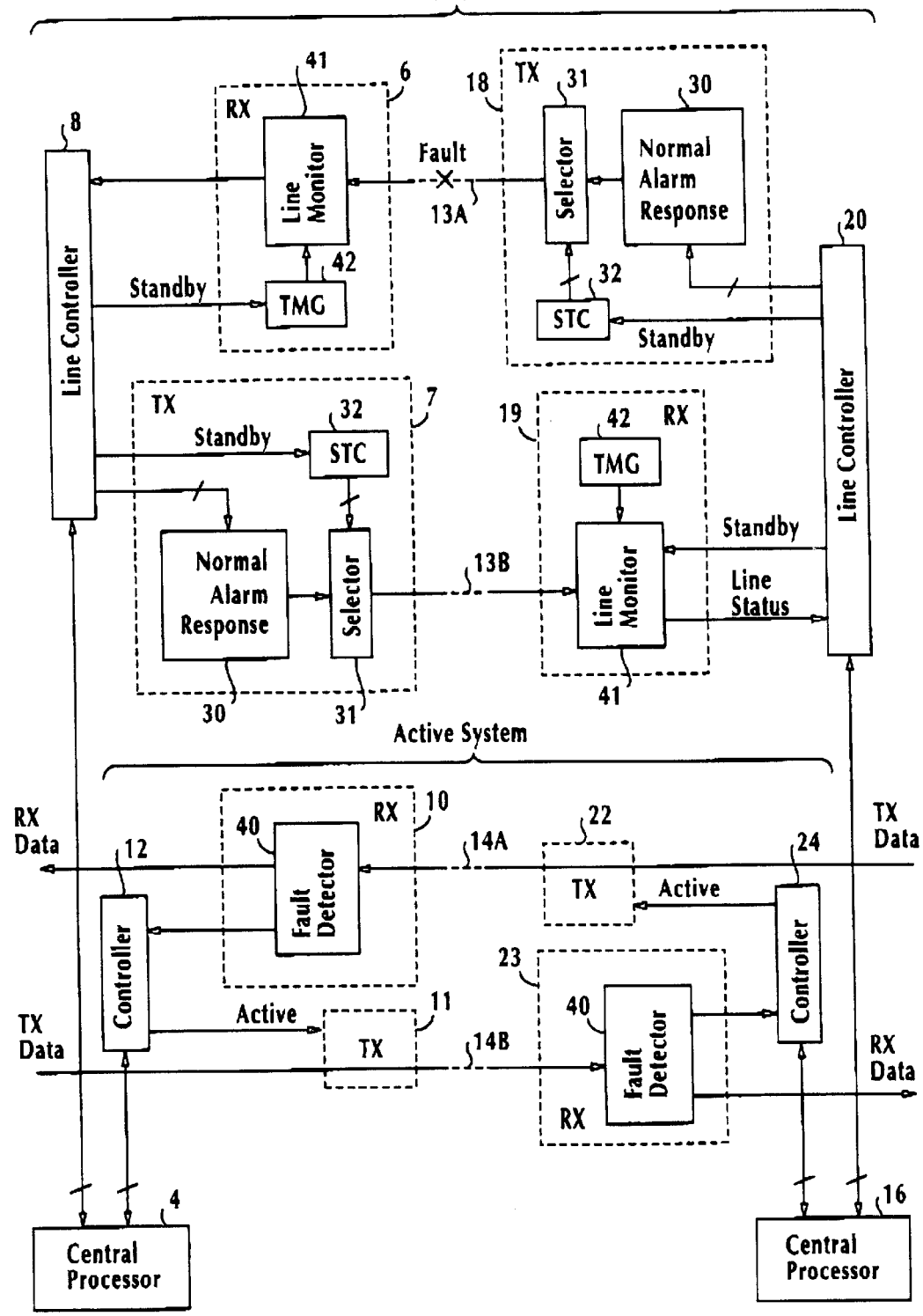

PROTECTION SWITCHING USING STANDBY SYSTEM FOR TRANSMISSION OF LINE STATUS SIGNALS

BACKGROUND OF THE INVENTION

1. Field of the Invention

The present invention relates generally to protection switching between active and standby systems, and more specifically to protection switching of a communication network where transmission lines are duplicated for backup purposes.

2. Description of the Related Art

Japanese Laid-Open Patent Specification 2-260729 discloses a duplicated network of active and standby transmission systems between local and remote control units such as time-division multiplexers. Each of the active and standby transmission systems includes a local line termination unit and a remote line termination unit interconnected by highseed digital dedicated lines. Each of the local and remote control units transmits signals in the coded mark inversion (CMI) format, As a means for establishing frame synchronization, the rule of violation is utilized. If a failure occurs in the active system, the local line termination unit loses track of a transmitted frame and sends a unit-not-ready signal to the local control unit, recognizing that a failure has occurred. The local control unit then stops sending the frame synchronization signal to the remote line termination unit. The latter responds to the lost of a transmitted frame by sending a unit-not-Receive signal to the associated control unit, signalling the occurrence of a failure in the active system. Protection switching from the failed active system to the standby system is then performed by the local and remote control units.

However, in transmission systems where the rule of violation is not used as a means of establishing frame synchronization or where the type of units that produce a unit-not-ready signal in the event of a failure is not used, it is impossible to signal the occurrence of a system failure to the remote communication unit. In addition, since the loss of frame synchronization does not necessarily indicate the actual occurrence of a failure, protection switching may take place when the system loses synchronization due to a cause other than a system failure, resulting in a difficulty to distinguish between a system failure and a loss of synchronization.

SUMMARY OF THE INVENTION

It is therefore an object of the present invention to provide a communication network capable of protection switching of duplicated transmission systems of any type of line codes while eliminating the need to provide distinction between actual failures and simulated failures.

According to a first aspect of the present invention, there is provided a network node connected to a remote network node by an active transmission system and a standby transmission system, comprising active receive circuitry for receiving communication signals from the active transmission system and detecting an operating state of the active transmission system, active transmit circuitry for transmitting communication signals over the active transmission system to the remote network node, standby receive circuitry for receiving, from the standby transmission system, a status signal indicating an operating state of the active transmission system detected by the remote network node from the transmitted communication signals, standby transmit circuitry for transmitting a status signal indicating the operating state detected by the active receive circuitry over the standby transmission system to the remote network node, and control circuitry responsive to an operating state detected by the active receive circuitry and an operating state indicated by the status signal of the standby receive circuitry for performing a protection switching between the active and standby transmission systems.

According to a second aspect, the present invention provides a protection switching method for a local network node and a remote network node interconnected by an active transmission system and a standby transmission system, comprising the steps of (a) receiving, at the local network node, communication signals from the remote network node over the active transmission system, and detecting an operating state of the active transmission system, (b) transmitting, from the local network node, a first status signal indicating the detected operating state over the standby transmission system to the remote network node, (c) receiving, at the remote network node, communication signals from the local network node over the active transmission system, and detecting an operating state of the active transmission system, (d) transmitting, from the remote network node, a second status signal indicating the detected operating state over the standby transmission system to the local network node, (e) receiving the first status signal of the local network node at the remote network node over the standby transmission system, (f) receiving the second status signal of the remote network node at the local network node over the standby transmission system, and (g) performing a protection switching at the local and remote network nodes between the active and standby transmission systems in accordance with the first and second status signals.

BRIEF DESCRIPTION OF THE DRAWINGS

The present invention will be described in further detail with reference to the accompanying drawings, in which:

FIG. 2 is a timing diagram of a selector-and-timing controller of each line transmitter of FIG. 1;

FIG. 3A is a block diagram of the network for describing its operation when the active system is operating normally;

FIG. 3C is a block diagram of the network after a protection switching occurs between the failed active system to the standby system.

DETAILED DESCRIPTION

Figure 1A:
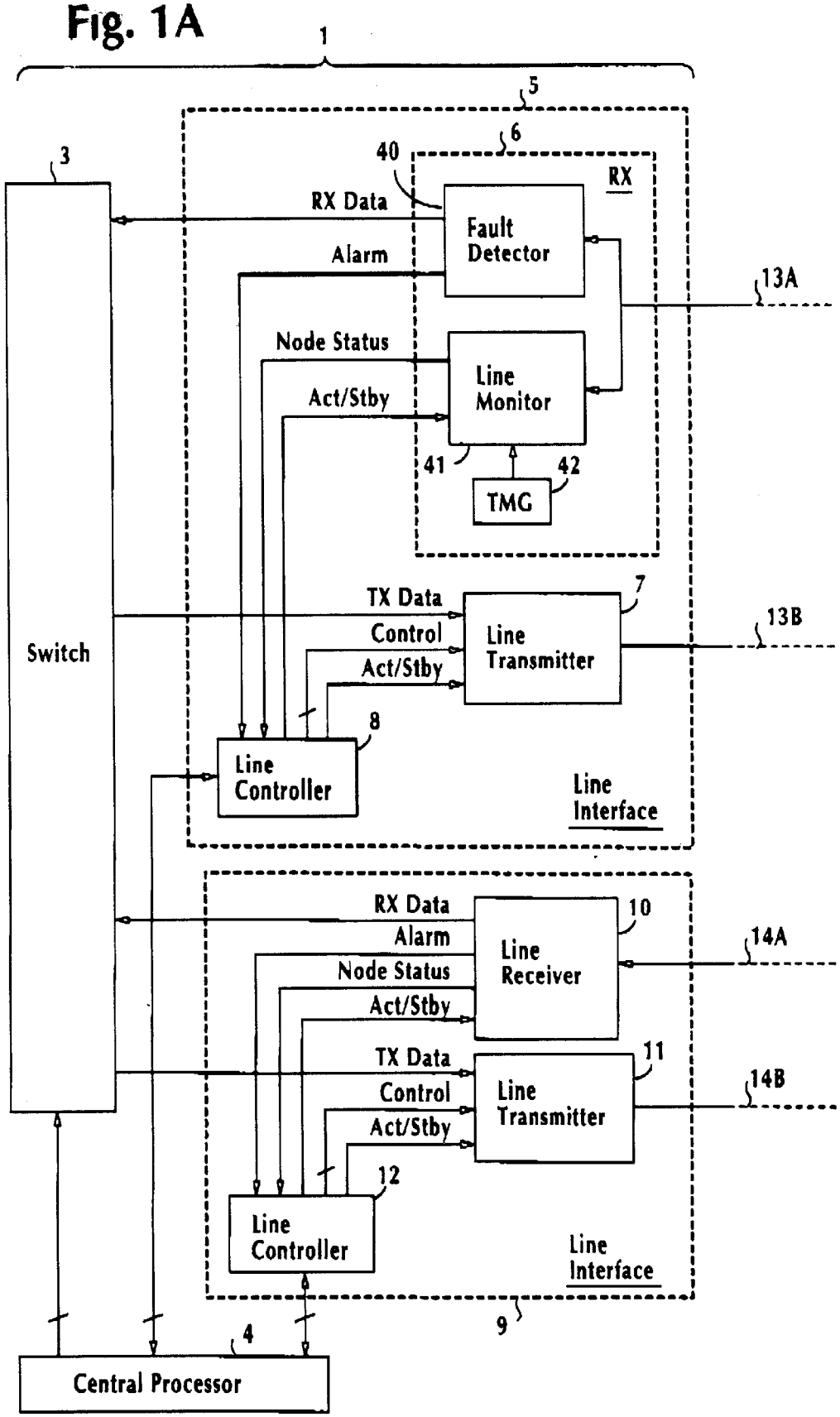
FIGS. 1A and 1B a block diagram of a duplicated communication network according to the present invention.
Figure 1B:
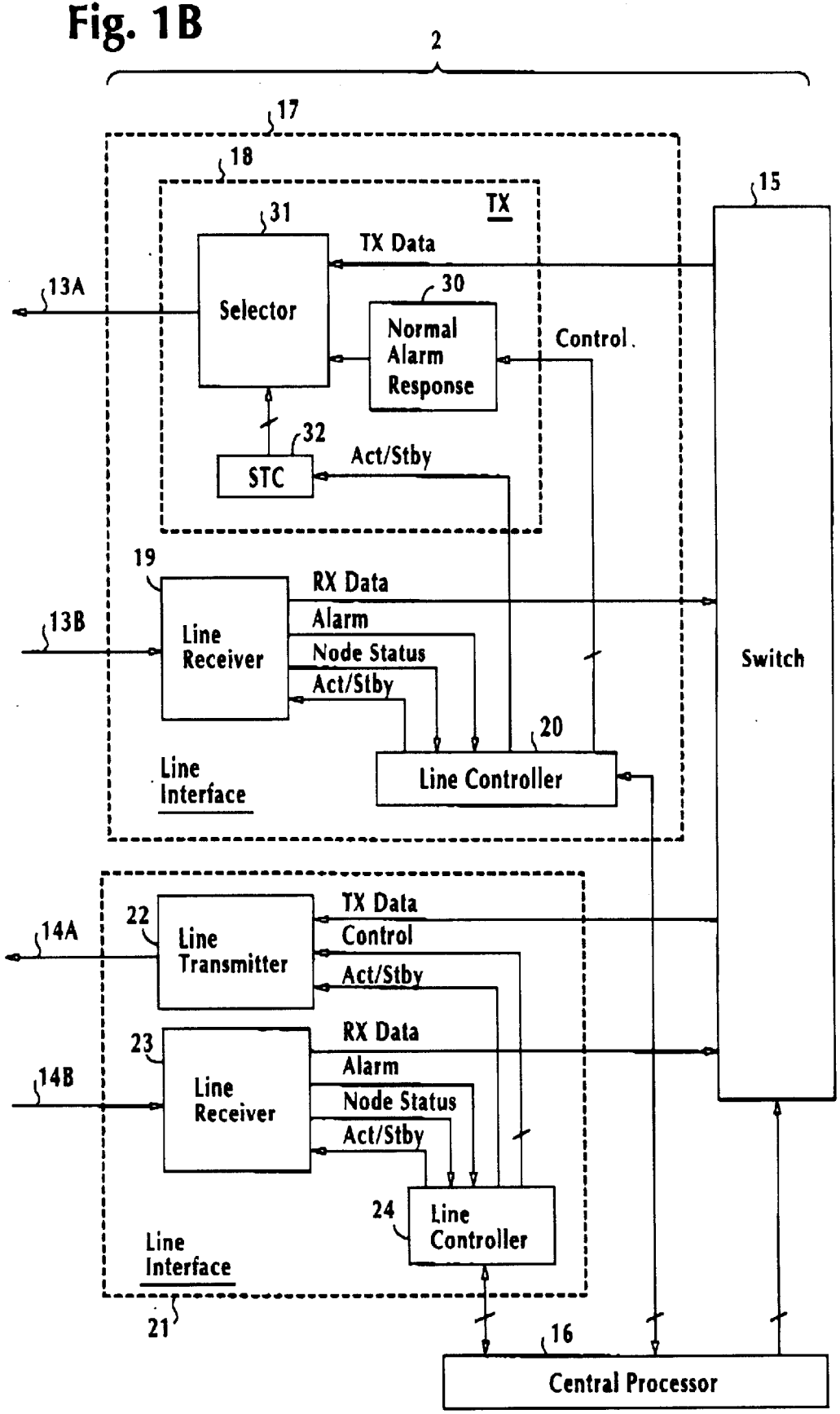

Referring now to FIGS. 1A and 1B, there is shown a communication network according to the present invention. As one example, the network is comprised of two switching nodes such as electronic private branch exchanges 1 and 2 respectively shown in FIGS. 1A and 1B. Switching nodes 1 and 2 are interconnected by a first pair of transmission lines 13A and 13B and a second pair of transmission lines 14A and 14B, one of the transmission line pairs being active while the other being inactive as a backup for the active system.

In FIG. 1A, the switching node 1 includes a line interface unit 5 connected between a switch 3 and the transmission lines 13A, 13B and a line interface unit 9 connected between the switch 3 and the transmission lines 14A, 14B. Switch 3 and the line interface units 5 and 6 are controlled by a central processor 4.

Similarly, the switching node 2, shown in FIG. 1B, includes a line interface unit 17 connected between a switch 15 and the transmission lines 13A, 13B and a line interface unit 21 connected between the switch 15 and the transmission lines 14A, 14B. Switch 15 and the line interface units 17 and 21 are controlled by a central processor 16.

All line interface units are identically comprised of a line transmitter, a line receiver and a line controller. In each switching node, each line controller is connected to the central processor, which serves as a communication path between the line controllers.

Line interface unit 17 includes a line transmitter 18 connected via the transmission line 13A to a line receiver 6 of the line interface unit 5 whose line transmitter 7 is connected via the transmission line 13B to the line receiver 19 of line interface unit 17. Similarly, the line interface unit 9 includes a line transmitter 11 connected via the transmission line 14B to a line receiver 23 of the line interface unit 21 whose line transmitter 22 is connected via the transmission line 14A to the line receiver 10 of line interface unit 9.

For simplicity, only the line transmitter 18 of interface unit 17 is shown in FIG. 1B and the line receiver 6 of line interface 5 are shown in detail in FIG. 1A.

Each line transmitter, as represented by the transmitter 18 in FIG. 1B, consists of a memory 30, a selector 31 and a selector-and-timing controller (STC) 32. Node status data such as normal indication, alarm indication and response indication are stored in the memory 30 to selectively supply one of the stored node status data to the selector 31 in accordance with a control signal from the line controller 20. Selector-and-timing controller 32 receives an active/standby (ACT/STBY) signal from the line controller 20. The active/standby signal is 0 when the line transmitter is in active mode and is 1 when it is in standby mode. Selector-and-timing controller 32 controls the selector 31 to be positioned to the upper terminal when the ACT/STBY logic is 0. Otherwise, it causes the selector 31 to be positioned in the lower terminal and provides a slot position signal to enable the output of selector 30 to be forwarded onto the transmission line 13A during a specified timeslot.

As illustrated in FIG. 2, when the line transmitter is active, the active/standby signal is at logic 0 and the selector-and-timing controller 32 supplies a zero-output signal to the selector 31. In the presence of this zero-level signal, the selector 31 selects transmit data (TX Data) from the switch 15 and forwards it onto the transmission line 13A. The transmit data is of a framed structure containing a series of time-division digital signals on timeslots $TS_0$ to $TS_N$.

On the other hand, when the line transmitter is in standby mode, the active/standby signal is at logic 1 and the selector-and-timing controller 32 is enabled to supply the timeslot signal as shown in FIG. 2 to the selector 31. In response to the timeslot signal, the selector 31 is moved to the lower position to selects the output of the memory 30 and inserts the signal selected by the memory 30 into a timeslot $TS_X$ of each frame that is specified by the timeslot signal.

Each line receiver, as represented by the receiver 6, consists of a fault detector 40, a line monitor 41 and a timing circuit 42. If the line receiver 6 is in active mode, the fault detector 40 receives the transmitted data of the switching node 2 and examines its framing bits and alarm bits to detect a failure in the transmission line 13A and forwards the receive data to the switch 3. Line monitor 41, which is also connected to the transmission line 13A, is enabled when the line receiver 6 is inactive. Line monitor 41 examines node status data inserted on a timeslot of the standby transmission line 13A specified by the timing circuit 42 and supplies the inserted status indication to the line controller 8. Thus, the line status indication from the transmitter 18 represents a status of the active system as detected by the switching node 2. The line status indication received by the line monitor 41 is communicated via the line controller 8 to the central processor 4.

Each of the central processors 4 and 16 exchanges data with the associated active line controller to determine if the line transmitter and receiver of the active line interface unit are functioning properly. If a failure is detected in the active line interface of a switching node, the central processor of the node performs protection switching to the standby system in the same manner as it does when a failure is detected by the fault detector 40.

The operation of the network will be described below with the aid of FIGS. 3A, 3B and 3C by assuming that lines 13A and 13B and their associated circuitry are active and lines 14A and 14B and their associated circuitry are set idle in the standby mode.

In FIG. 3A, if the active transmission line 13A and its associated circuitry are functioning properly, the fault detector 40 of line receiver 6 produces no alarm signal and the line controller 8 sends "normal" indication to the central processor 4. Central processor 4 knows that the active line 13A and the associated receiver 6 are normally operating and commands the line controller 12 to read "normal" indication from the memory 30 of the standby transmitter 11 for transmission on the timeslot $TS_X$ over the standby line 14B. At the switching node 2, the normal indication signal is received by the line monitor 41 of receiver 23 and communicated to the central processor 16 via the line controller 24. The communication paths of the normal indication of the active line 13A are indicated by solid thick lines.

If the active transmission line 13B and its associated circuitry are also functioning properly, the fault detector 40 of line receiver 19 produces no alarm signal and the line controller 20 sends "normal" indication to the central processor 16. Central processor 16 knows that the active line 13B and the associated receiver 19 are normally operating and commands the line controller 24 to read "normal" indication from the memory 30 of the standby transmitter 22 for transmission on the timeslot $TS_X$ over the standby line 14A. At the switching node 1, the normal indication signal is received by the line monitor 41 of receiver 10 and communicated to the central processor 4 via the line controller 12. The communication paths of the normal indication of the active line 13B are indicated by dotted thick lines.

The normal indication may be transmitted between the switching nodes at periodic intervals over the standby transmission lines as long as the active system is working properly.

Figure 3B:
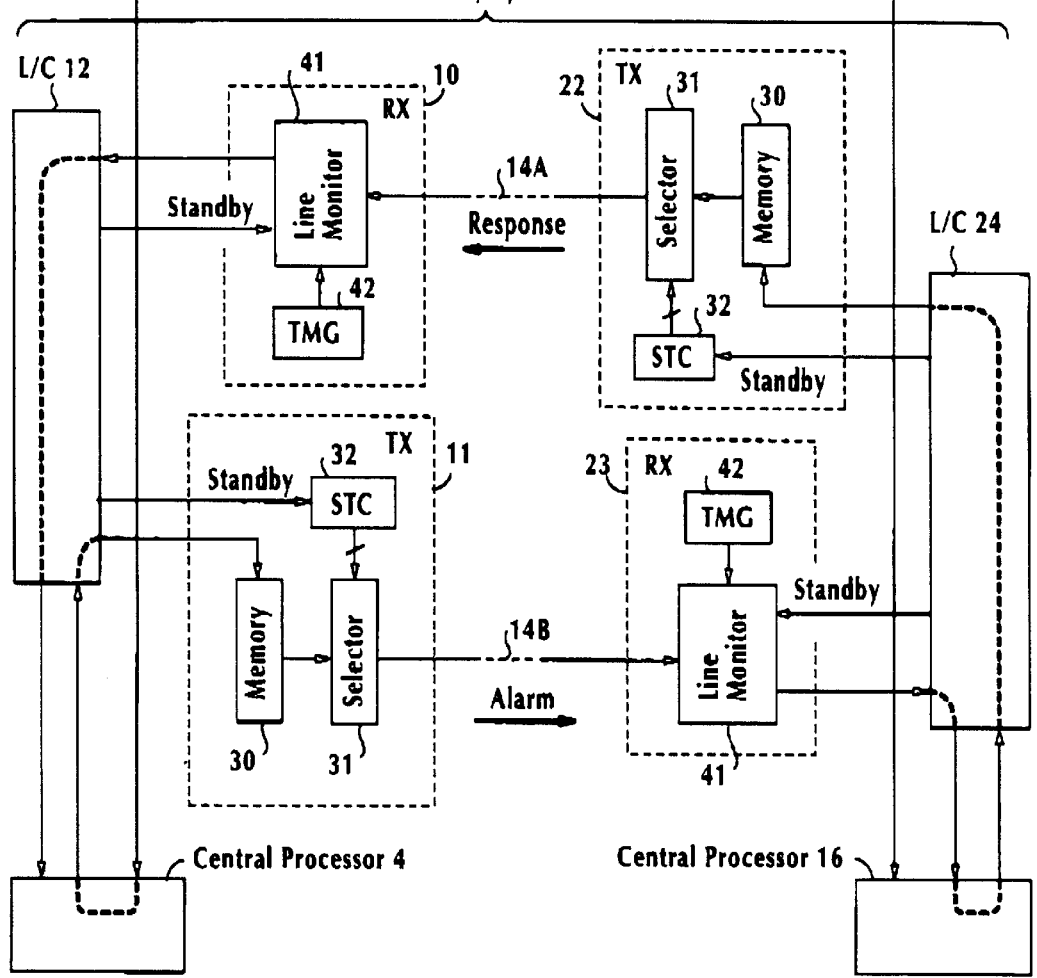
FIG. 3B is a block diagram of the network for describing its operation when a failure occurs in the active system.

If a failure occurs in the transmission line 13A, as indicated by a symbol "X" in FIG. 3B, the fault detector 40 of line receiver 6 supplies an alarm signal to the active line controller 8. This alarm signal is communicated to the central processor 4. In response, the central processor 4 commands the standby line controller 12 to read alarm indication from the status data memory 30 of transmitter 11 and transmit it over the standby transmission line 14B. Line receiver 23 of the switching node 2 alarms the line controller 24, which communicates the alarm to the central processor 16. Central processor 16 recognizes that a failure has occurred in the transmission line 13A and commands the line controller 24 to return a response indication to the switching node 1. Line controller 24 thus reads response indication from the memory 30 of transmitter 22 for transmission over the standby line 14A. In the switching node 1, the line monitor 41 of receiver 10 receives the response indication and communicates this signal to the central processor 4 via the line controller 12. Central processor 4 knows that the transmitted alarm signal is received by the remote switching node 2. The communication paths of the alarm indication of the active line 13A are indicated by dotted thick lines in FIG. 3B.

Central processors 4 and 16 now perform protection switching from the current active system to the current standby system by controlling the associated switches 3 and 15 so that transmit data from the node 2 is supplied to the now active line transmitter 22 and transmit data from the node 1 is supplied to the now active line transmitter 11, as illustrated in FIG. 3C. In the transmitters 11 and 22, transmit data from the associated switches is selected for full-frame transmission over lines 14B and 14A. In FIG. 3C, the line monitor 41 of the receiver 6 is connected to the line 13A to monitor transmitted normal indication signal in order to detect the recovery of the line from failure.

What is claimed is:

1. A network node connected to a remote network node by an active transmission system and a standby transmission system, comprising:

active receive circuitry for receiving communication signals from the active transmission system and detecting an operating state of the active transmission system;

active transmit circuitry for transmitting communication signals over the active transmission system to said remote network node;

standby receive circuitry for receiving, from the standby transmission system, a status signal indicating an operating state of said active transmission system detected by said remote network node from said transmitted communication signals;

standby transmit circuitry for transmitting a status signal indicating the operating state detected by the active receive circuitry over the standby transmission system to said remote network node; and control circuitry responsive to an operating state detected by said active receive circuitry and an operating state indicated by the status signal of said standby receive circuitry for performing a protection switching between said active and standby transmission systems.

2. A communication network as claimed in claim 1, wherein said standby transmit circuitry is arranged to transmit a response signal over the standby transmission system when the status signal received by said standby receive circuitry indicates that a failure has occurred in said active transmission system, wherein said remote network node is arranged to transmit a response signal in response to the failure-indicating status signal, and wherein said control circuitry is responsive to the response signal of the remote network node for performing said protection switching.

3. A communication network as claimed in claim 1, wherein said standby transmit circuitry is arranged to transmit said status signal during a specified timeslot of the standby transmission system.

4. A communication network comprising first and second network nodes interconnected by active and standby transmission systems, said first network node comprising:

first active receive circuitry for receiving communication signals from the active transmission system and examining the received communication signals to produce a first status signal indicating an operating state of the active transmission system;

first active transmit circuitry for transmitting communication signals over the active transmission system;

first standby receive circuitry for receiving, from the standby transmission system, a second status signal indicating an operating state of said active transmission system detected by said second network node;

first standby transmit circuitry for transmitting said first status signal over the standby transmission system; and first control circuitry responsive to one of said first and second status signals for performing a protection switching between said active and standby transmission systems, said second network node comprising:

second active receive circuitry for receiving communication signals from said active transmission system and examining the received communication signals to produce an output signal indicating an operating state of the active transmission system;

second active transmit circuitry for transmitting communication signals over the active transmission system;

second standby receive circuitry for receiving said first status signal over the standby transmission system from said first standby transmit circuitry;

second standby transmit circuitry for transmitting the output signal of said second active receive circuitry as said second status signal over the standby transmission system to said first standby receive circuitry; and second control circuitry responsive to one of said first and second status signals for performing a protection switching between said active and standby transmission systems.

5. A communication network as claimed in claim 4, wherein said first standby transmit circuitry is arranged to transmit a first response signal over the standby transmission system when the first status signal indicates that a failure has occurred in said active transmission system, wherein said second standby transmit circuitry is arranged to transmit a second response signal over the standby transmission system when the second status signal indicates that a failure has occurred in said active transmission system, and wherein said first control circuitry is responsive to the first response signal for performing said protection switching and said second control circuitry is responsive to the second response signal for performing said protection switching.

6. A communication network as claimed in claim 4, wherein said standby transmit circuitry is arranged to transmit said status signal during a specified timeslot of the standby transmission system.

7. A protection switching method for a local network node and a remote network node interconnected by an active transmission system and a standby transmission system, comprising the steps of:

a) receiving, at said local network node, communication signals from the remote network node over the active transmission system, and detecting an operating state of the active transmission system;

b) transmitting, from the local network node, a first status signal indicating the detected operating state over the standby transmission system to said remote network node;

c) receiving, at said remote network node, communication signals from the local network node over the active transmission system, and detecting an operating state of the active transmission system;

d) transmitting, from the remote network node, a second status signal indicating the detected operating state over the standby transmission system to said local network node;

e) receiving said first status signal of the local network node at said remote network node over the standby transmission system;

f) receiving said second status signal of the remote network node at said local network node over the standby transmission system; and g) performing a protection switching at said local and remote network nodes between said active and standby transmission systems in accordance with said first and second status signals.

8. A protection switching method as claimed in claim 7, wherein the step (e) comprises transmitting a first response signal from the remote network node to the local network node over the standby transmission system when said first status signal indicates that a failure has occurred in the active transmission system, and wherein the step (f) comprises transmitting a second response signal from the local network node to said remote network node over the standby transmission system when said second status signal indicates that a failure has occurred in the active transmission system, and wherein the step (g) comprises performing said protection switching in response to said first and second response signals.

* * * * *